US011216000B2

(12) United States Patent
Johnson et al.

(10) Patent No.: US 11,216,000 B2
(45) Date of Patent: Jan. 4, 2022

(54) SYSTEM AND METHOD FOR ESTIMATING LANE PREDICTION ERRORS FOR LANE SEGMENTS

(71) Applicant: Toyota Motor Engineering & Manufacturing North America, Inc., Plano, TX (US)

(72) Inventors: Miles J. Johnson, Ann Arbor, MI (US); Christopher J. Smalley, Canton, MI (US); Matthew W. Dreisbach, Kentwood, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 177 days.

(21) Appl. No.: 16/250,217

(22) Filed: Jan. 17, 2019

(65) Prior Publication Data

US 2020/0233426 A1  Jul. 23, 2020

(51) Int. Cl.
| | | |
|---|---|---|
| *G05D 1/02* | (2020.01) | |
| *G05B 13/04* | (2006.01) | |
| *G05B 13/02* | (2006.01) | |
| *B60W 30/12* | (2020.01) | |
| *G05D 1/00* | (2006.01) | |
| *B60Q 9/00* | (2006.01) | |

(52) U.S. Cl.
CPC ............ *G05D 1/0221* (2013.01); *B60Q 9/00* (2013.01); *B60W 30/12* (2013.01); *G05B 13/0265* (2013.01); *G05B 13/048* (2013.01); *G05D 1/0061* (2013.01); *G05D 1/0231* (2013.01); *G05D 1/0255* (2013.01); *G05D 1/0257* (2013.01); *G05D 2201/0213* (2013.01)

(58) Field of Classification Search
CPC ... G05D 1/0221; G05D 1/0061; B60W 30/12; B60Q 9/00; G05B 13/0265; G05B 13/048
USPC .......................................................... 701/23
See application file for complete search history.

(56) References Cited

U.S. PATENT DOCUMENTS

| | | |
|---|---|---|
| 6,385,539 B1 | 5/2002 | Wilson et al. |
| 7,034,742 B2 | 4/2006 | Cong et al. |
| 7,522,091 B2 | 4/2009 | Cong et al. |
| 7,933,433 B2 | 4/2011 | Ogawa |
| 2010/0191461 A1 | 7/2010 | Zeng |
| 2016/0046290 A1 | 2/2016 | Aharony et al. |
| 2016/0140848 A1 | 5/2016 | Kim et al. |
| 2016/0169683 A1 | 6/2016 | Lynch |

(Continued)

*Primary Examiner* — Isaac G Smith
(74) *Attorney, Agent, or Firm* — Christopher G. Darrow; Darrow Mustafa PC

(57) ABSTRACT

A method for predicting lane error based on an identifier of a lane segment is disclosed. The method includes receiving a predicted location in a lane segment of a plurality lane segments for a first vehicle traveling on the lane segment. The method includes receiving a determined location of the first vehicle in the lane segment for the first vehicle. The method includes determining a difference between the predicted location in the lane segment received for the first vehicle and the determined location of the first vehicle in the lane segment. The method includes providing the determined difference between the predicted location in the lane segment received for the first vehicle and the determined location of the first vehicle in the lane segment and an identifier of the lane segment as first training data to a lane error estimation model.

19 Claims, 7 Drawing Sheets

(56) References Cited

U.S. PATENT DOCUMENTS

| | | |
|---|---|---|
| 2016/0325753 A1 | 11/2016 | Stein et al. |
| 2017/0193338 A1 | 7/2017 | Huberman et al. |
| 2017/0234689 A1 | 8/2017 | Gibson et al. |
| 2018/0066960 A1* | 3/2018 | Tateishi .............. G01C 21/3461 |
| 2019/0193730 A1* | 6/2019 | Voorheis ............... B60W 40/04 |
| 2020/0139992 A1* | 5/2020 | Oba ...................... B60W 50/14 |

* cited by examiner

SYSTEM AND METHOD FOR ESTIMATING LANE PREDICTION ERRORS FOR LANE SEGMENTS

TECHNICAL FIELD

The subject matter described herein relates, in general, to a system and method for predicting errors associated with lane location predictions, and, in particular, to using predicted lane locations and observed vehicle locations to train a model to predict the errors.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect a presence of objects and other features of the surrounding environment. In further examples, additional/alternative sensors such as cameras may be implemented to acquire information about the surrounding environment from which a system derives awareness about aspects of the surrounding environment. This sensor data can be useful in various circumstances for improving perceptions of the surrounding environment so that systems such as autonomous and semi-autonomous driving systems can perceive the noted aspects and accurately plan and navigate accordingly.

In the context of lane prediction, observations of a surrounding environment by sensors of the vehicle may be used to predict the future locations of lanes for lane keeping functions, and other autonomous and semi-autonomous vehicle modes. However, as lane markings vary in quality and type, such lane predictions can be difficult. In addition, location specific conditions such as poor lighting due to trees or other obstructions and weather conditions can also make lane predictions difficult. Because autonomous and semi-autonomous driving modes rely on such lane predictions for navigation and other safety features, it is important that the vehicle be aware when lane prediction may become inaccurate or unreliable.

SUMMARY

In one embodiment, example systems and methods relate to a manner of determining when lane prediction systems produce estimates of lane locations that may be considered unreliable or subject to error. These locations may be associated with poor lane markers or other road conditions that may make lane location prediction difficult. As vehicles travel, predicted lane locations for lane segments as provided by the vehicle lane prediction systems are collected. The predicted lane locations and the actual locations of the vehicles are used to train a model how to identify where lane prediction systems are likely to produce unreliable or error prone information. Thus, the lane prediction system can subsequently provide warnings to a driver or indicators to various systems of the vehicle about the generated lane predictions. In this way, the system improves the use of autonomous/non-auto systems according to a predicted reliability of produced lane data.

In one embodiment, a lane error estimation system for predicting lane error for a lane segment is disclosed. The lane error estimation system includes one or more processors and a memory communicably coupled to the one or more processors. The memory stores a lane prediction module including instructions that when executed by the one or more processors cause the one or more processors to receive first sensor data from one or more sensors associated with a vehicle traveling on a first lane segment of a plurality of lane segments, and based on the received first sensor data, predict a location in the first lane segment at a predetermined distance from the vehicle. The memory further stores an error estimation module including instructions that when executed by the one or more processors cause the one or more processors to after the vehicle has traveled the predetermined distance in the first lane segment, determine a location of the vehicle in the first lane segment, determine a difference between the predicted location in the first lane segment and the determined location of the vehicle in the first lane segment, and provide the determined difference between the predicted location in the first lane segment and the determined location of the vehicle in the first lane segment and an identifier of the first lane segment as first training data to a lane error estimation model.

In one embodiment, a method for predicting lane error for a lane segment is disclosed. The method includes receiving a predicted location in a lane segment of a plurality lane segments for a first vehicle traveling on the lane segment. The predicted location is at a predetermined distance from the vehicle. The method includes receiving a determined location of the first vehicle in the lane segment for the first vehicle. The determined location of the first vehicle in the lane segment was determined after the first vehicle traveled the predetermined distance in the lane segment. The method includes determining a difference between the predicted location in the lane segment received for the first vehicle and the determined location of the first vehicle in the lane segment. The method includes providing the determined difference between the predicted location in the lane segment received for the first vehicle and the determined location of the first vehicle in the lane segment and an identifier of the lane segment as first training data to a lane error estimation model.

In one embodiment, a non-transitory computer-readable medium for predicting lane error is disclosed. The non-transitory computer-readable medium includes instructions that when executed by one or more processors cause the one or more processors to perform one or more functions. The instructions include instructions to receive an identifier of a lane segment of a plurality of lane segments for a first vehicle. The instructions include instructions to predict, based on the identifier of the lane segment and a lane error estimation model, a lane error for the lane segment. The instructions include instructions to determine if the predicted lane error does not satisfy a threshold lane error. The instructions include instructions to perform, if it is determined that the predicted lane error does not satisfy the threshold lane error, one or more safety procedures.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
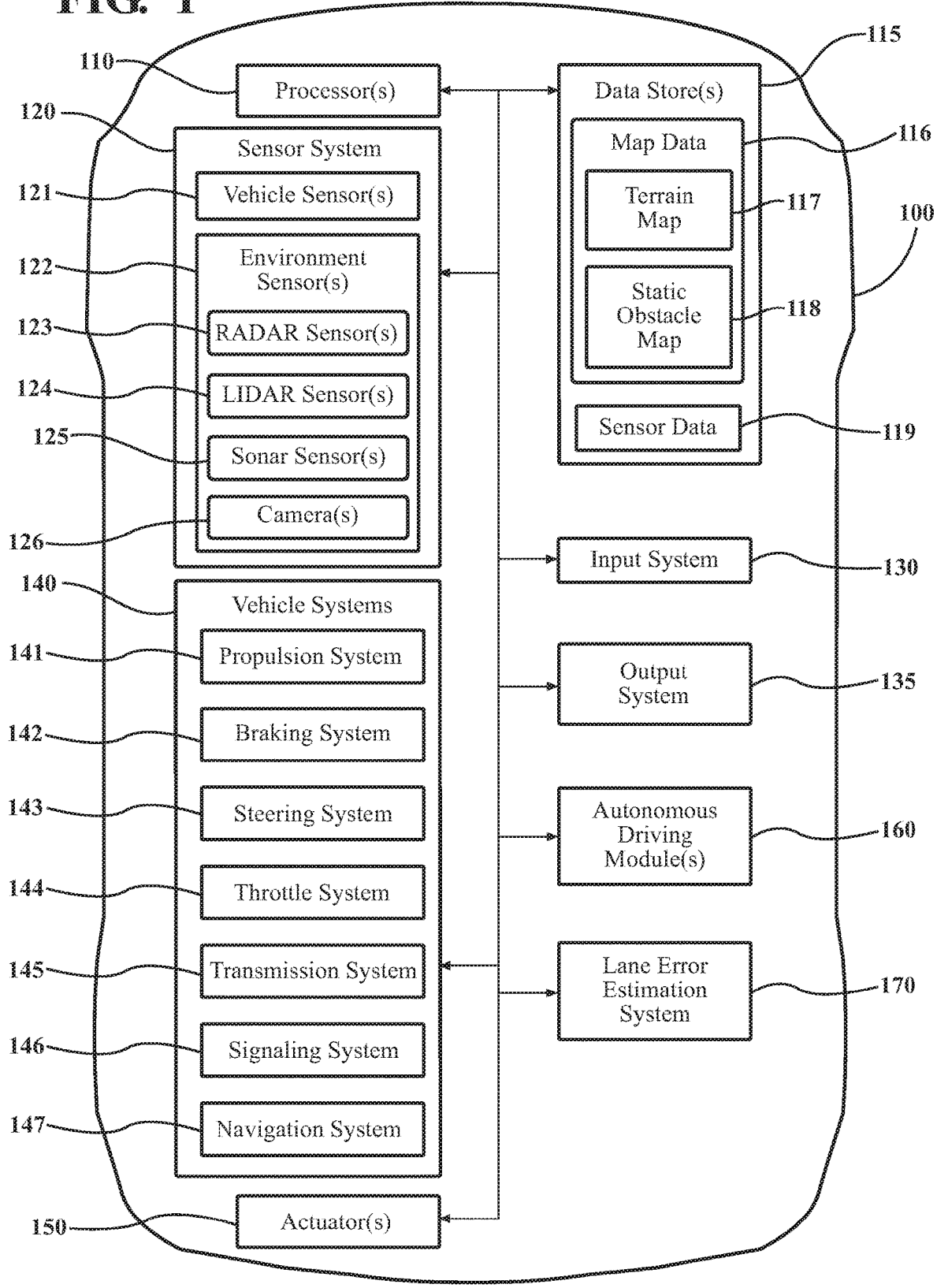
FIG. 1 illustrates one embodiment of a vehicle within which systems and methods disclosed herein may be implemented.

Systems, methods, and other embodiments associated with predicting the error for a lane prediction are disclosed. As mentioned previously, a vehicle may use sensors to make one or more lane predictions with respect to a lane that the vehicle is traveling on. These predictions may include a location of the center of a lane and the locations of lane boundaries. Typically, these predicted locations are at some predetermined distance from the vehicle in the direction that the vehicle is traveling in (e.g., one meter, five meters, or ten meters). The predetermined distance may be based on the range of the camera or other sensor. The predicted locations can be used as input for one or more autonomous or semi-autonomous vehicle modes, or to predict when a vehicle may be drifting outside of the lane.

While such lane predictions are generally reliable, sometimes road conditions can result in lane prediction errors. The road conditions may include poor, incomplete, or eroded lane markers, weather conditions that may obscure lane markers, or strange, unusual or unexpected lane shapes, which may make lane prediction difficult. Because drivers, and autonomous and semi-autonomous vehicle modes, rely on lane predictions for autonomous and semi-autonomous driving modes and other vehicle safety features, it is important that it can be determined where lane prediction errors are likely to occur.

Therefore, in one embodiment, a lane error estimation system, and associated methods as disclosed herein, provide for training a model to predicts the location error in the prediction of a lane such as the center location of the lane. To train the lane error estimation model, the system divides lanes into what are referred to herein as "lane segments." The system associates each lane segment with an identifier for subsequent identification. The lane segment identifier may be a number, for example. The lane segments can be approximately the same length (e.g., 10 meters, 50 meters, or 100 meters), or can be of different lengths.

As a vehicle travels along a lane segment, the system uses sensor data from sensors associated with the vehicle to generate a lane prediction with respect to the lane segment. The lane prediction may be a prediction of a location at a predetermined distance in front of the vehicle or on a path being traveled by the vehicle in the lane segment. The prediction may be made using only the sensors of the vehicle, and not using a map. The location may be a location of the center of the lane segment or a location of one or more boundaries of the lane segment. The predetermined distance may be 100 meters, for example. Other distances may be used or selected. Any method or technique for predicting locations in lanes may be used. As used herein "lane location" may be defined as a geometric representation (e.g. curve, spline, etc.) of a lane parameter (e.g. centerline, boundary, etc.). After the vehicle travels the predetermined distance in the lane segment, the actual location of the vehicle in the lane segment is determined. The actual location of the vehicle may be determined using one or more global positioning system (GPS) sensors. Other methods for determining the actual location of a vehicle in a lane segment may be used.

As may be appreciated, when a user operates a vehicle, they tend to keep the vehicle centered about the center location of the lane. Accordingly, the actual location of the center of the vehicle can be used as an estimate for the center position of the lane segment. The actual location of the vehicle in the center of the lane and the predicted center location may be compared to determine whether or not lane prediction is accurate with respect to the lane segment.

In one embodiment, a difference between the predicted location and the actual location of the vehicle may be determined. The vehicle map may provide the determined difference and an identifier of the lane segment as training data to the lane error estimation model. As the vehicle (and other vehicles) travel the various lane segments over time, they continue to generate and provide such training data. The system, in one approach, employs machine learning (or other model based techniques) to generate and/or refine the lane error estimation model using the training data. Depending on the embodiment, the model may be built using statistical regression. For example, a weighted projection regression may be used to get a function of the error over the distance of the lane segments. The model may be built using locally weighted projection regression (LWPR) models.

The lane error estimation model may be configured to receive as an input an identifier of a lane segment and provide as an output a prediction that is referred to herein as the "lane error" for the identified lane segment. The lane error represents the suitability of outputs produced by a lane prediction system with respect to an identified lane segment and may be the expected difference between a predicted location of a lane center produced by the lane prediction system in contrast to an actual or observed location of the lane center. A relatively low value for the lane error of a lane segment may indicate that the lane prediction system is expected to produce accurate lane predictions for the lane segment, while a relatively high value for the lane error may indicate that the lane prediction system is expected to have difficulties with the lane segment.

The system can use the lane errors described above to provide a variety of improved safety features for the vehicle that incorporates the lane error estimation model. In particular, the system can predict when an upcoming lane segment for a vehicle has high lane error, and can take action before the vehicle reaches the lane segment and experiences any adverse effects due to the lane error.

For example, when a vehicle is traveling a route that includes lane segments, the vehicle can determine, using the lane error estimation model, if any of the upcoming lane segments in the route have a high lane error. If so, the vehicle can implement one or more improved safety procedures. In one embodiment, the vehicle may alert the driver that one or more autonomous or semi-autonomous vehicle modes that rely on lane prediction (e.g., lane assist) may be unreliable for the identified lane segment and should be disabled. For example, the vehicle may display a warning or provide an audio warning to the driver. In another embodiment, the system may automatically disable one or more autonomous or semi-autonomous vehicle modes according to the lane error. For example, the vehicle may cause the driver to cease using an autonomous driving mode and take manual control of the vehicle. Other improved safety features are described below.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perform lane prediction, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a lane error estimation system 170 that is implemented to perform methods and other functions as disclosed herein relating to predicting an error for a lane prediction based on an identifier of a lane segment. The noted functions and methods will become more apparent with a further discussion of the figures.

Figure 2:
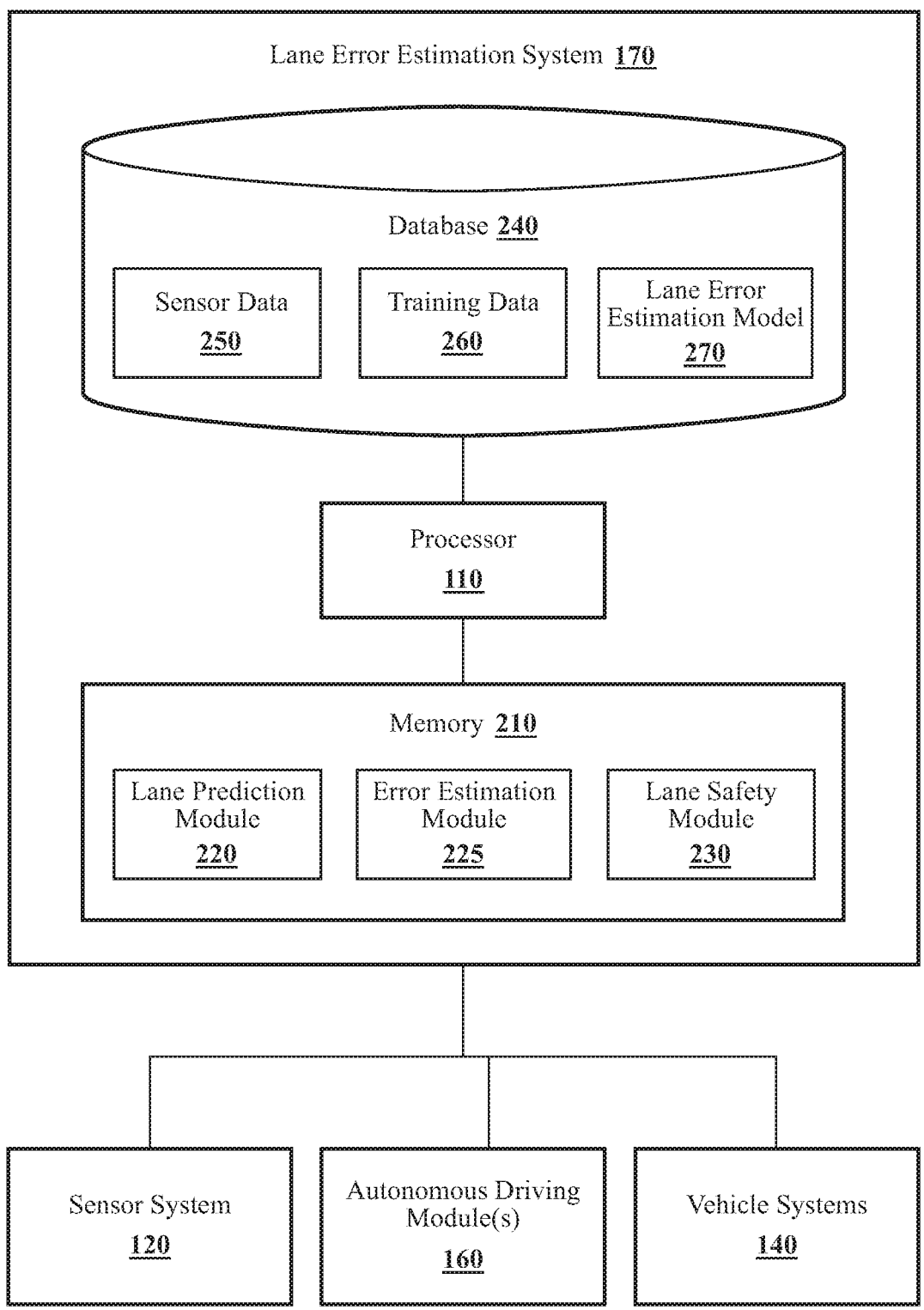
FIG. 2 illustrates one embodiment of a lane error estimation system that is configured to predict the lane error associated with a lane prediction for a lane segment.

With reference to FIG. 2, one embodiment of the lane error estimation system 170 of FIG. 1 is further illustrated. The lane error estimation system 170 is shown as including a processor 110 from the vehicle 100 of FIG. 1. Accordingly, the processor 110 may be a part of the lane error estimation system 170, the lane error estimation system 170 may include a separate processor from the processor 110 of the vehicle 100 or the lane error estimation system 170 may access the processor 110 through a data bus or another communication path. In one embodiment, the lane error estimation system 170 includes a memory 210 that stores a lane prediction module 220, an error estimation module 225, and a lane safety module 230. The memory 210 is a random-access memory (RAM), read-only memory (ROM), a hard-disk drive, a flash memory, or other suitable memory for storing the modules 220, 225, and 230. The modules 220, 225, and 230 are, for example, computer-readable instructions that when executed by the processor 110 cause the processor 110 to perform the various functions disclosed herein.

Accordingly, the lane prediction module 220 generally includes instructions that function to control the processor 110 to receive data inputs from one or more sensors of the sensor system 120 of the vehicle 100 that form sensor data 250, which embodies observations of the surrounding environment of the vehicle 100 including one or more lane segments. The present discussion will focus on acquiring the sensor data 250 using multiple sensors of the vehicle 100 including, for example, radar 123 and camera 126. However, it should be appreciated that the disclosed approach can be extended to cover further configurations of sensors such as LiDAR sensors with one or more cameras, different types of LiDARs and cameras, combinations of radars and cameras, sonar, use of a single sensor (e.g., camera), sensors of the surrounding vehicles leveraged via vehicle-to-vehicle communications (v2v), and so on.

Accordingly, the lane prediction module 220, in one embodiment, controls the respective sensors to provide the data inputs in the form of the sensor data 250. Additionally, while the lane prediction module 220 is discussed as controlling the various sensors to provide the sensor data 250, in one or more embodiments, the lane prediction module 220 can employ other techniques to acquire the sensor data 250 that are either active or passive. For example, the lane prediction module 220 may passively sniff the sensor data 250 from a stream of electronic information provided by the various sensors to further components within the vehicle 100. Moreover, as previously indicated, the lane prediction module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of measurements acquired from multiple sensors.

Furthermore, in one embodiment, the lane error estimation system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220, 225, and 230 in executing various functions. In one embodiment, the database 240 includes sensor data 250 along with, for example, other information that is used by the modules 220, 225, and 230 such as training data 260 and a lane error estimation model 270. Of course, in further embodiments, the sensor data 250, training data 260, and the lane error estimation model 270 are stored within the memory 210 or another suitable location.

As a further explanation of the sensor data 250 that is leveraged by the lane prediction model 220 to produce the noted determinations, the sensor data 250 can include 3D point cloud data, camera images and/or video from the camera 126, radar measurements, and so on. In further embodiments, the sensor data 250 includes information from further sensors (e.g., an IMU) that may be used to perform various tasks (e.g., motion blur correction) in support of the processes noted herein.

The lane prediction module 220 is further configured to analyze the sensor data 250 to make one or more lane predictions with respect to a lane segment that the vehicle 100 is traveling in. In one embodiment, the lane prediction module 220 may predict a location of a center of the lane segment. However, other locations in the lane segment may be predicted such as a location of a right lane boundary and a location of a left lane boundary. Other locations or lane geometries may be predicted by the lane prediction module 220.

The predicted location may be at a predetermined distance from the vehicle 100 in the direction that the vehicle is traveling in. For example, the lane prediction module 220 may continuously, or at scheduled intervals, predict the location of the center of the lane segment ten meters in front of the vehicle 100. The predetermined distance may be fixed or dynamic and may depend on variables such as vehicle speed, visibility, weather, or lighting conditions, for example.

The error estimation module 225 is configured to use the predicted locations generated by the lane prediction module 220 to generate training data 260 for the lane error estimation model 270. The error estimation module 225 may generate training data 260 while the vehicle 100 is operating in a manual or semi-autonomous driving mode. In an embodiment, the error estimation module 225 may generate training data 260 by determining, for each predicted location generated by the lane prediction model 220, the actual location of the vehicle 100 after the vehicle 100 traveled the predetermined distance in the lane segment. The error estimation module 225 may receive the actual location of the vehicle 100 from one or more vehicle systems 140 such as the navigation system 147. For example, the navigation system 147 may use a GPS to determine the vehicle 100 location in the lane segment and may provide the location to the error estimation module 225.

The error estimation module 225 is further configured to store the predicted location, the actual location, and an identifier of the lane segment as the training data 260. Thus, each piece of training data 260 may be a tuple that includes the predicted location, the actual location, and an identifier of the lane segment. In some embodiments, the training data 260 may include other data that may be useful in predicting lane prediction error. This data may include data indicative of current weather conditions (e.g., temperature, humidity, wind speed), traffic conditions, vehicle 100 statistics (e.g., current speed), lighting conditions, time, and date. Other data may be included in the training data 260.

The error estimation module 225 is further configured to train the lane error estimation model 270 using the training data 260. In one embodiment, the error estimation module 225 may generate the lane error estimation model 270 for each tuple of training data 260 by determining a difference between the predicted location for the lane segment and the actual location of the vehicle 100 in the lane segment. The determined differences for each identified lane segment may then be used to train the lane error estimation model 270. In one embodiment, the error estimation module 225 may train the lane error estimation model 270 using a machine learning algorithm. However, any method for generating a predictive model may be used.

The error estimation module 225 may continuously update the lane error estimation model 270 as new location predictions for identified lane segments are received from the lane prediction module 220. Thus, the lane error estimation model 270 may continuously learn based on new training data 260.

The error estimation module 225 is further configured to use the lane error estimation model 270 to predict the lane error in a lane prediction based on an identifier of a lane segment. The lane error predicted using the lane error estimation model 270 for a lane segment may represent the expected difference between the location predicted by the lane prediction module 220 and the actual location of the vehicle 100 after the vehicle 100 travels the predetermined distance in the identified lane segment.

The lane safety module 230 is configured to perform one or more safety procedures based on the lane errors predicted by the error estimation module 225. In one embodiment, the lane safety module 230 may receive information about a current road or route being traveled by the vehicle 100 and may determine identifiers of the lane segments associated with the current road or route. For example, the lane safety model 230 may receive information about the current road or route from one or more vehicle systems 140 such as the navigation system 147.

The lane safety module 230 is further configured to provide the lane segment identifiers associated with the current route to the error estimation module 225. The error estimation module 225 may then predict, for each identified lane segment, the lane error for the identified lane segment using the lane error estimation model 270.

The lane safety module 230 is further configured to compare the lane error for an identified segment to a threshold lane error, and may determine whether the identified segment satisfies the threshold lane error. The threshold lane error may be satisfied when the lane error is below the threshold lane error. The threshold lane error may be set by a user or administrator and may be a static value such as three meters. Alternatively, the error may be a dynamic value and may be based on data such as a current vehicle 100 speed, the time of day, traffic conditions, and current weather conditions. A lane error below the threshold lane error may indicate that the lane prediction module 220 may be accurate with respect to the associated lane segment. A lane error above the threshold error may indicate that the lane prediction module 220 may not be accurate correctly with respect to the associated lane segment.

The lane safety module 230 is further configured to perform one or more safety procedures when the lane error for an identified lane segment does not satisfy the threshold lane error. In one embodiment, the one or more safety procedures may include alerting a driver of the vehicle 100. For example, the lane safety module 230 may cause the output system 135 to display or sound a warning to the driver of the vehicle 100 that they are approaching a lane segment where lane prediction may be unreliable or incorrect. The lane safety module 230 may highlight the lane segment to the driver on a map displayed by the output system 135. The warning may indicate that the user should not rely on any autonomous or semi-autonomous driving modes of the vehicle 100 such as lane assist.

In another embodiment, the one or more safety procedures may include disabling one or more autonomous or semi-autonomous driving modes of the vehicle 100. For example, the lane safety module 230 may cause the output system 135 to display or sound a warning to the driver of the vehicle 100 that one or more autonomous or semi-autonomous vehicle modes will be disabled for an upcoming lane segment. After ensuring that the driver has taken control of the vehicle 100, the lane safety module 230 may then instruct the autonomous driving modules(s) 160 to disable the one or more autonomous or semi-autonomous vehicle modes. The lane safety module 230 may enable the one or more autonomous or semi-autonomous vehicle modes after the vehicle 100 exits the lane segment.

In another embodiment, the one or more safety procedures may include changing a route or road currently being traveled by the vehicle 100. The lane safety module 230 may request that the navigation system 147 calculate a new route or select a new road that avoids the lane segment with the lane error that exceeded the threshold lane error. The lane safety module 230 may cause the output system 135 to display the new route to the driver of the vehicle 100 for approval.

Figure 3:
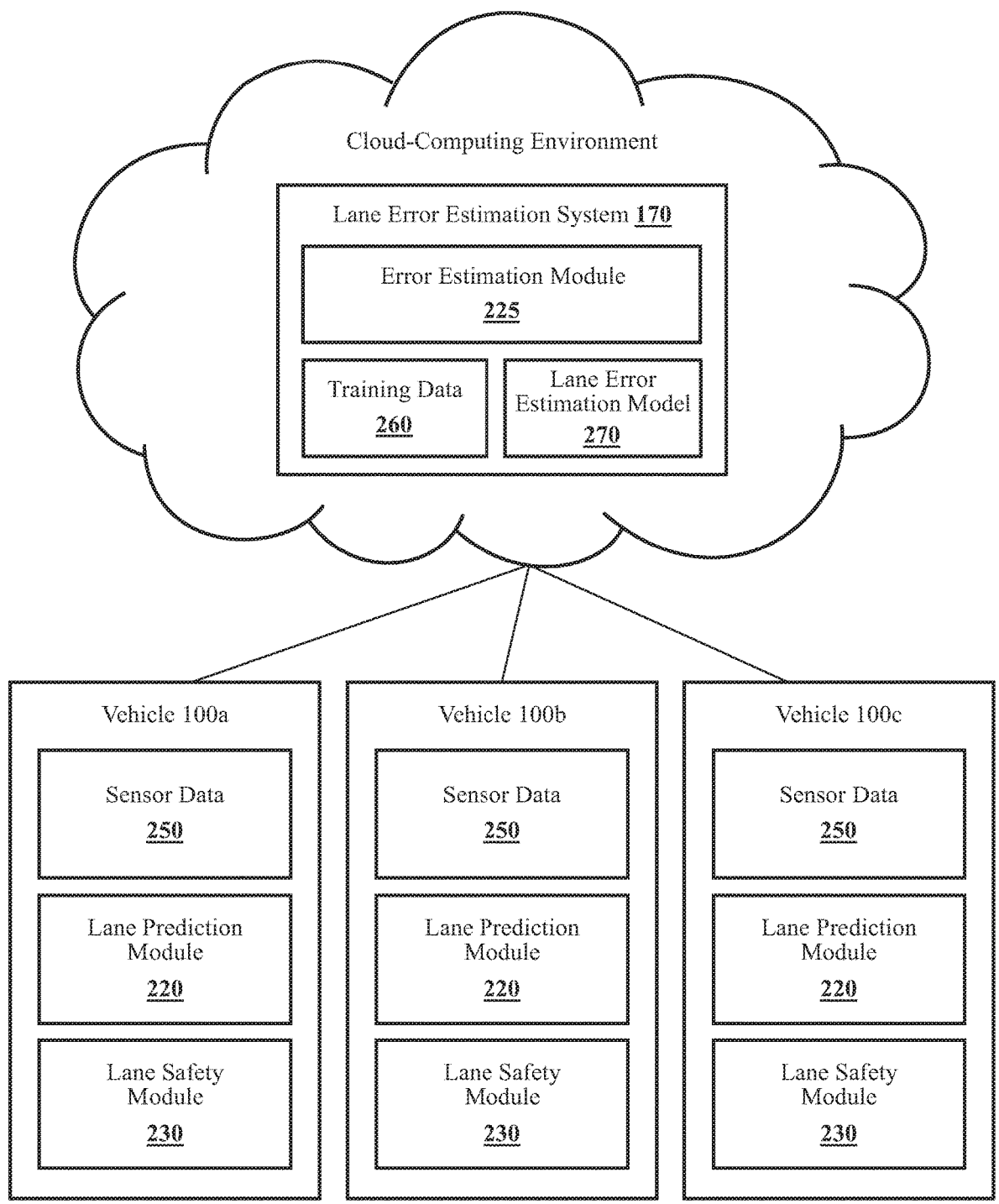
FIG. 3 illustrates one embodiment of the lane error estimation system using a cloud-computing environment.

With reference to FIG. 3, another embodiment of the lane error estimation system 170 of FIG. 1 is further illustrated. The lane error estimation system 170 is implemented using a cloud-computing environment. In particular, the error estimation module 225, training data 260, and lane error estimation model 270 are implemented using the cloud-computing environment.

The lane error estimation system 170 may be in communication with a plurality of vehicles 100 (i.e., the vehicles 100a, 100b, and 100c) through a network or other communication means. While only three vehicles 100 are shown, it is for illustrative purposes only; there is no limit to the number of vehicles 100 that may be supported.

In the embodiment shown, each vehicle 100 includes its own sensor data 250, lane prediction module 220, and lane safety module 230. In particular, the lane prediction module 220 associated with each vehicle 100 is configured to predict a location in a lane segment being traveled by the respective vehicle 100 at a predetermined distance, and to determine the location of the respective vehicle 100 after the vehicle 100 has traveled the predetermined distance in the lane segment. The lane prediction module 220 associated with each vehicle 100 is further configured to send the difference between the predicted location and the location of the respective vehicle 100 and an identifier of the lane segment to the error estimation model 225.

The error estimation module 225 is configured to receive the differences and lane segment identifiers from each of the vehicles 100, and to store the received differences and lane segment identifiers as the training data 260. The error estimation module 225 may then generate and train the lane error estimation model 270 using the training data 260 as described previously. As may be appreciated, by generating the lane estimation model 270 using data collected and received from a variety of vehicles 100 for a variety of lane segments, the lane error predictions generated by the lane error estimation model 270 may be improved.

The lane safety module 230 associated with each vehicle 100 is configured to provide identifiers of lane segments for its respective vehicle 100 to the error estimation module 225. The identified lane segments may be those lane segments that the respective vehicle 100 is going to be traveling on. The error estimation module 225 is configured to receive the lane segment identifiers, predict the lane errors for each identified lane segments using the lane error estimation model 270, and to provide the predicted lane errors to the lane safety modules 230 at the respective vehicles 100. Each lane safety module 230 may then perform one on more safety procedures as described previously based on the predicted lane errors.

Figure 4:
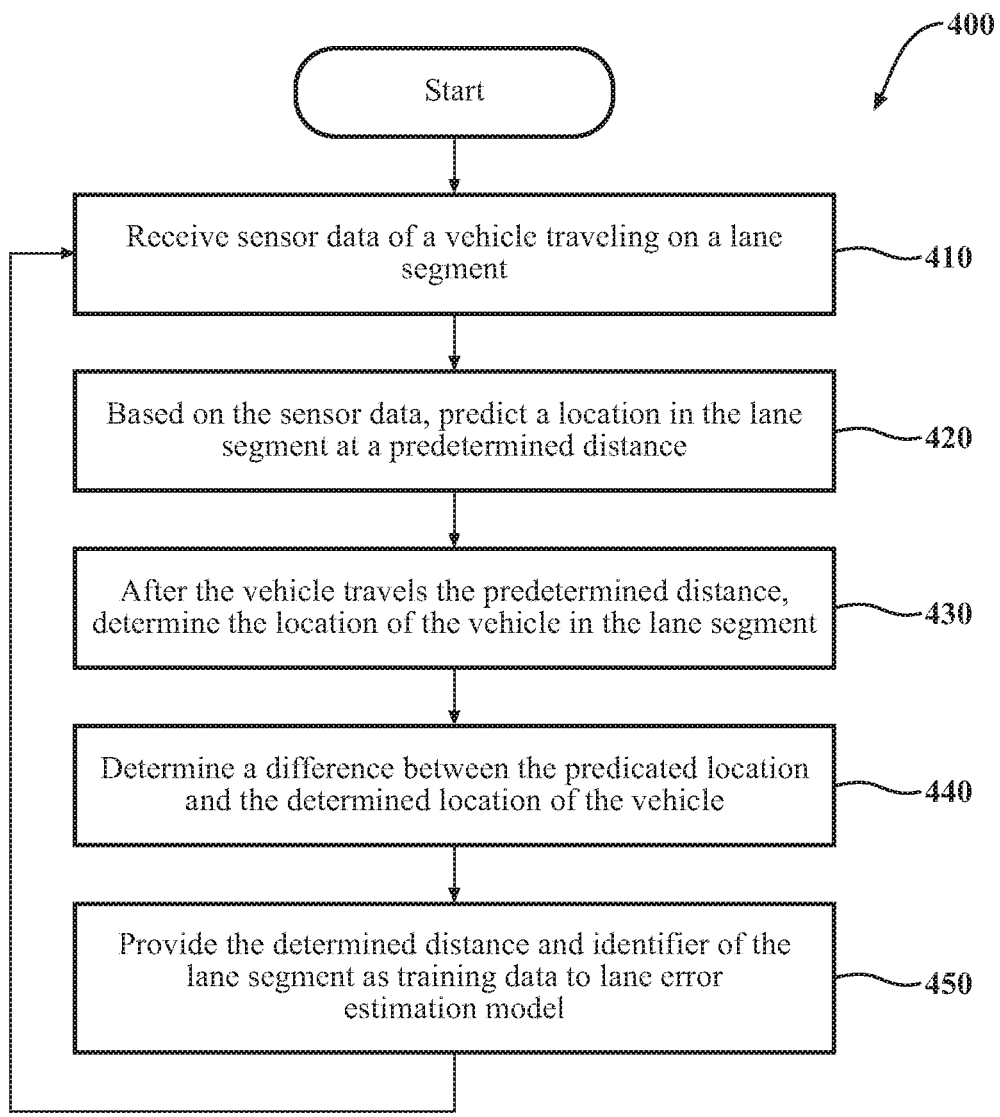
FIG. 4 illustrates a flowchart of a method that is associated with generating and providing training data to a lane error estimation model.

Additional aspects of training a lane error estimation model 270 will be discussed in relation to FIG. 4. FIG. 4 illustrates a flowchart of a method 400 that is associated with generating and providing training data to a lane error estimation model. The method 400 will be discussed from the perspective of the lane error estimation system 170 of FIGS. 1, 2, and 3. While the method 400 is discussed in combination with the lane error estimation system 170, it should be appreciated that the method 400 is not limited to being implemented within the lane error estimation system 170 but is instead one example of a system that may implement the method 400.

At 410, the lane prediction module 220 receives sensor data 250 from the sensor system 120 of a vehicle 100 traveling on a lane segment. In one embodiment, the lane prediction module 220 may receive sensor data 250 from the LiDAR sensor 124 and/or the camera 126 of the vehicle 100. Alternatively, or additionally, the lane prediction module 220 controls the camera 126 and the radar 123 or another set of sensors to acquire the sensor data 250.

At 420, the lane prediction module 220 predicts a location in the lane segment based on the received sensor data 250. The location may be a location of the center of the lane segment at a predetermined distance from the vehicle 100. Alternatively, or additionally, the location may be a location of the right or left border of the lane segment at the predetermined distance of the vehicle 100. Any method for predicting a lane location may be used.

Figure 6:
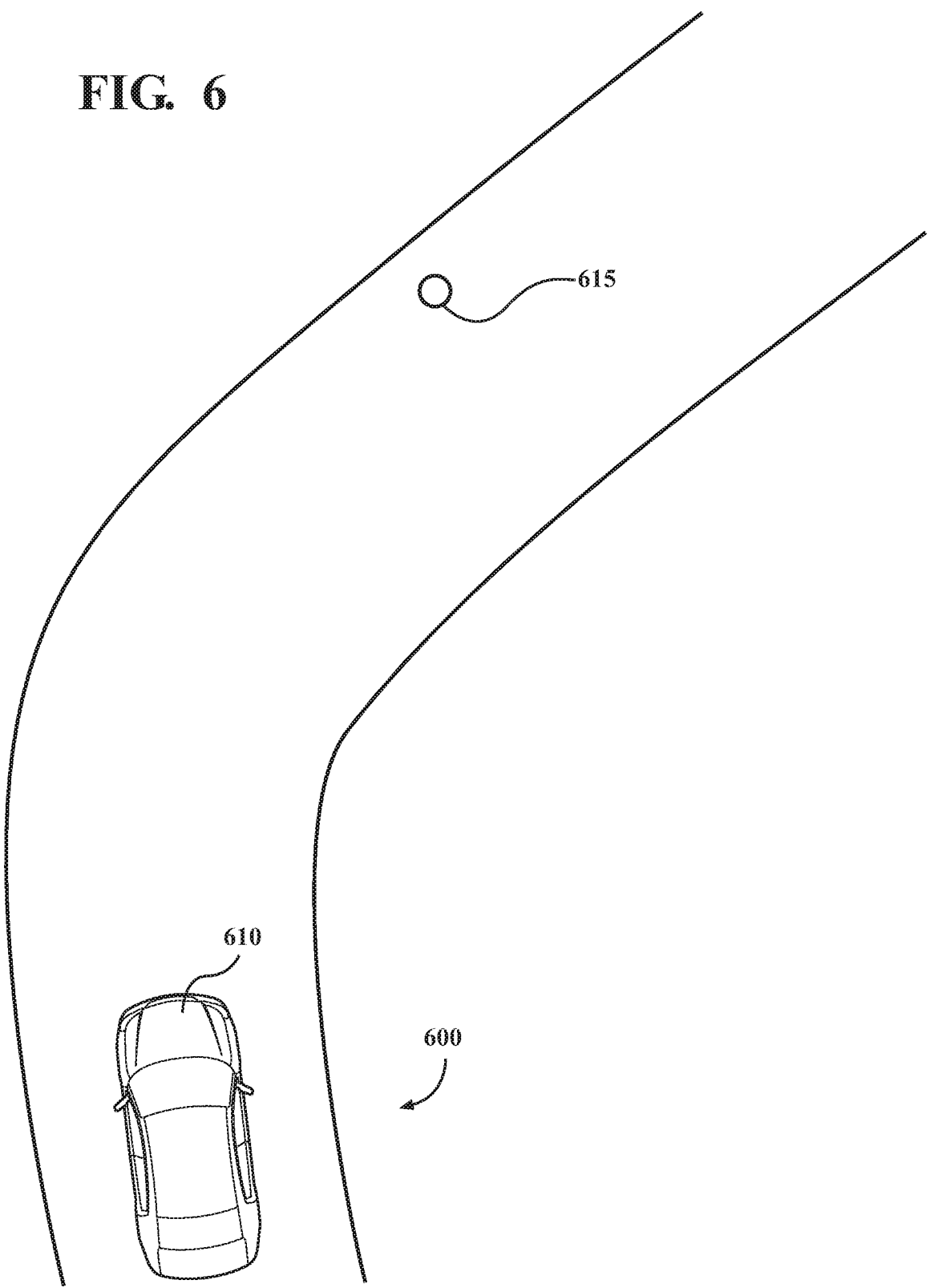
FIG. 6 illustrates an example vehicle traveling in a lane segment.

By way of example, FIG. 6 illustrates an example vehicle 610 traveling in a lane segment 600. The lane prediction module 220 of the lane error estimation system 170 associated with the vehicle 610 has predicted a location of the lane segment 600 at the predetermined distance. The predicted location is illustrated in FIG. 6 as the location 615.

At 430, the error estimation module 225 determines a location of the vehicle 100 after the vehicle 100 traveled the predetermined distance in the lane segment. The location of the vehicle 100 may be provided to the error estimation module 225 by a GPS or other location determination component of the vehicle systems 140. In one embodiment, the lane prediction module 220 and the error estimation module 225 may be located on the same vehicle 100 (i.e., FIG. 2). In another embodiment, the lane prediction module 220 may be located on the vehicle 100, while the error estimation module 225 is part of a cloud-computing environment.

At 440, the error estimation module 225 determines a difference between the predicted location and the determined location of the vehicle 100. The determined difference represents the discrepancy between the location predicted by the lane prediction module 220 and the actual location of the vehicle as determined by the error estimation module 225.

Figure 7:
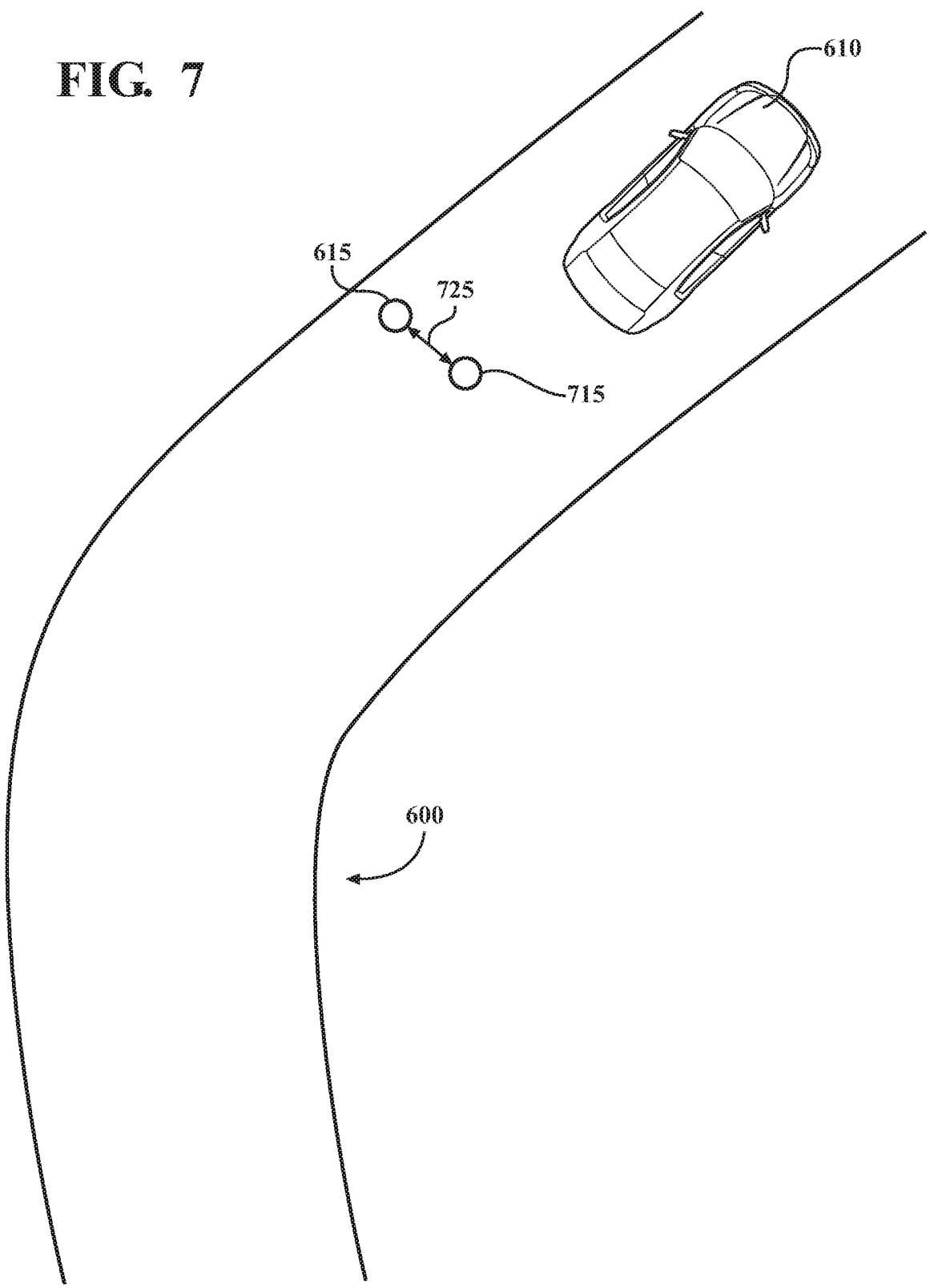
FIG. 7 illustrates an example vehicle after traveling the predetermined distance in the lane segment.

Continuing the example of FIG. 6, FIG. 7 illustrates the example vehicle 610 after traveling the predetermined distance in the lane segment 600. The location 615 is the predicted location of the center of the lane segment 600 at the predetermined distance. The actual location of the vehicle 610 after the vehicle 610 traveled the predetermined distance is illustrated in FIG. 7 as the location 715. The difference between the locations 615 and 617 determined by the error estimation module 225 is illustrated in FIG. 7 as the line 725.

At 450, the error estimation model 225 provides the determined distance and identifier of the lane segment as training data 260 to the lane error estimation model 270. In some embodiments, additional data may be included in the training data 260. For example, the additional data may include current weather or traffic conditions, the speed of the vehicle 100, and the current date and/or time. After providing the training data 260 to the lane error estimation model 270, the method 400 may then return to 410 where the lane prediction module 220 can receive additional sensor data 250 and predict another location for the same or a different lane segment.

Figure 5:
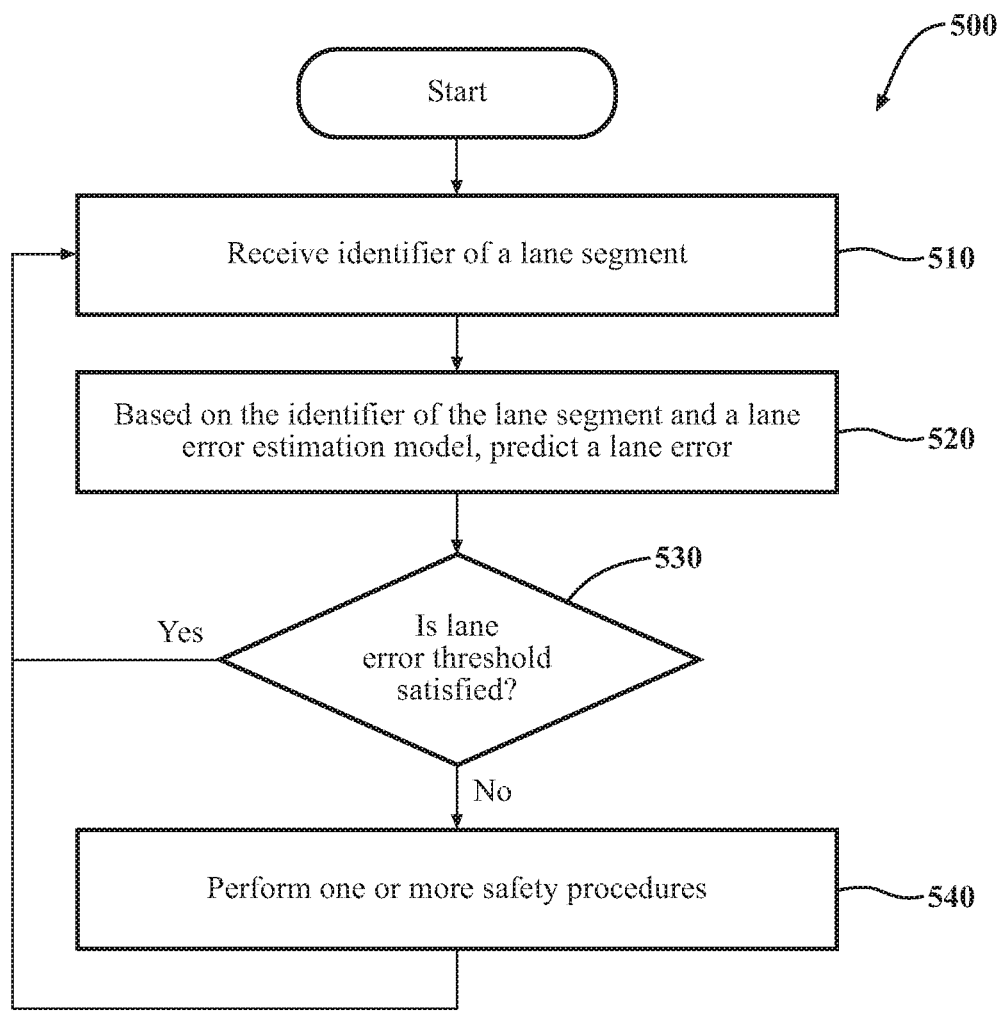
FIG. 5 illustrates a flowchart of a method that is associated with estimating a lane error for a lane segment using a lane error estimation model.

Additional aspects of estimating a lane error will be discussed in in relation to FIG. 5. FIG. 5 illustrates a flowchart of a method 500 that is associated with predicting a lane error for a lane segment using a lane error estimation model 270. The method 500 will be discussed from the perspective of the lane error estimation system 170 of FIGS. 1, 2, and 3. While the method 500 is discussed in combination with the lane error estimation system 170, it should be appreciated that the method 500 is not limited to being implemented within the lane error estimation system 170 but is instead one example of a system that may implement the method 500.

At 510, an identifier of a lane segment is received by the error estimation module 225. The identified lane segment may be a lane segment that a vehicle 100 is currently traveling on, or that the vehicle 100 will be traveling on in the future. For example, the identified lane segment may be part of a route the vehicle 100 is traveling on. The identifier of the lane segment may be received from one or more vehicle systems 140 such as the navigation system 147. In one embodiment, the error estimation module 225 may be located on the same vehicle 100 that provides the identifier of the lane segment (i.e., FIG. 2). In another embodiment, the error estimation module 225 is part of a cloud-computing environment that is separate from the vehicle 100 (i.e., FIG. 3). In such an embodiment, the error estimation module 225 may receive the identifier of the lane segment from the vehicle 100 through a network or other communication means. Alternatively, the error estimation module 225 may receive a location associated with the vehicle 100 (e.g., GPS coordinates), and the error estimation module 225 may determine the identified lane segment based on the received location.

At 520, the error estimation module 225 predicts a lane error using the lane error estimation model 270 based on the identified lane segment. In embodiments where the error estimation module 225 is located on the same vehicle 100 that the lane segment identifier was received from, the error estimation module 225 may provide the predicted lane error to the lane safety module 230 located on the vehicle 100. In embodiments where the error estimation module 225 is part of a cloud-computing environment, the error estimation module 225 may provide the predicted lane error to the lane safety module 230 through a network or other communication means.

At 530, the lane safety module 230 determines if the lane error for the identified lane segment satisfies a threshold lane error. The lane error may satisfy the threshold lane error if it is below the threshold lane error. A lane error greater than the threshold lane error may indicate that the lane prediction module 220 may not predict lane locations for the identified lane segment within an acceptable margin of error, while a lane error less than the threshold lane error may indicate that the lane prediction module 220 may predict lane locations for the identified lane segment with an acceptable margin of error. The threshold lane error may be set by a user or administrator. In some embodiments, the threshold lane error may be dynamic and may be based on data such as current weather conditions, time of day, and the particular autonomous driving modes supported by the vehicle 100.

If the lane error satisfies the threshold lane error, then the method 500 may return to 510 where an identifier of a different lane segment may be received by the error estimation module 225. Else, the method 500 may continue at 540.

At 540, the lane safety module 230 performs one or more safety procedures. Depending on the embodiment, the safety procedures may include the lane safety module 230 generating instructions to play or display a warning to the driver of the vehicle through the output system 135. The warning may indicate to the driver that they should not rely on autonomous or semi-autonomous vehicle modes for the lane segment. The safety procedures may further include the lane safety module 230 generating instructions to disable one or more of the autonomous or semi-autonomous vehicle modes for the lane segment and forcing the user to manually control the vehicle 100 while traveling on the lane segment. The safety procedures may further include the lane safety module 230 generating instructions to determine a new route for the vehicle 100 that does not include the identified lane segment.

After the one or more safety procedures are performed by the lane safety module 230, the method 500 may return to 510 where an identifier of a different lane segment may be received by the error estimation module 225.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the lane error estimation system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the lane error estimation system 170, and/or the autonomous driving module(s) 160 may control some or all of these vehicle systems 140 and, thus, may be partially or fully autonomous.

The processor(s) 110, the lane error estimation system 170, and/or the autonomous driving module(s) 160 can be operatively connected to communicate with the various vehicle systems 140 and/or individual components thereof. For example, returning to FIG. 1, the processor(s) 110, the lane error estimation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the lane error estimation system 170, and/or the autonomous driving module(s) 160 may control some or all of these vehicle systems 140.

The processor(s) 110, the lane error estimation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the lane error estimation system 170, and/or the autonomous driving module(s) 160 can control the direction and/or speed of the vehicle 100. The processor(s) 110, the lane error estimation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the lane error estimation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the occupancy module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle having a lane error estimation system for estimating lane error for a lane segment, comprising:
   vehicle systems including one or more of a propulsion system, a braking system, a steering system, a throttle system, a transmission system, a signaling system, or a navigation system;
   one or more processors; and
   a memory communicably coupled to the one or more processors and storing:
      an autonomous driving module including instructions that when executed by the one or more processors cause the one or more processors to control at least one of the vehicle systems to operate according to one or more autonomous or semi-autonomous driving modes;
      a lane prediction module including instructions that when executed by the one or more processors cause the one or more processors to:
         receive first sensor data from one or more sensors associated with the vehicle traveling on a first lane segment of a plurality of lane segments; and
         based on the first sensor data, predict a location in the first lane segment at a predetermined distance from the vehicle;
      an error estimation module including instructions that when executed by the one or more processors cause the one or more processors to:
         after the vehicle has traveled the predetermined distance in the first lane segment, determine a location of the vehicle in the first lane segment;
         determine a difference between a prediction of the location in the first lane segment and a determination of the location of the vehicle in the first lane segment; and
         provide the difference between the prediction of the location in the first lane segment and the determination of the location of the vehicle in the first lane segment and an identifier of the first lane segment as first training data to a lane error estimation model;
         receive an identifier of a second lane segment of the plurality of lane segments; and
         based on the identifier of the second lane segment and the lane error estimation model, predict a lane error for the second lane segment; and
      a lane safety module including instructions that when executed by the one or more processors cause the one or more processors to:
         determine if a prediction of the lane error is greater than a threshold lane error; and
         in response to a determination that the prediction of the lane error is greater than the threshold lane error, perform a procedure to cause the autonomous driving module to disable at least one of the one or more autonomous or semi-autonomous driving modes.

2. The vehicle having the lane error estimation system of claim 1, wherein the lane safety module further includes instructions to perform a procedure to alert a driver of the vehicle or a procedure to determine an alternative route for the vehicle that does not include the second lane segment.

3. The vehicle having the lane error estimation system of claim 2, wherein the procedure to cause the autonomous driving module to disable the at least one of the one or more autonomous or semi-autonomous driving modes comprises disabling lane assist for the second lane segment.

4. The vehicle having the lane error estimation system of claim 1, wherein the prediction of the location in the first lane segment at the predetermined distance from the vehicle is a center of the first lane segment.

5. The vehicle having the lane error estimation system of claim 1, wherein the lane prediction module further includes instructions to:
   receive second sensor data from the one or more sensors associated with the vehicle traveling on the second lane segment of the plurality of lane segments; and
   based on the second sensor data, predict a location in the second lane segment at the predetermined distance of the vehicle.

6. The vehicle having the lane error estimation system of claim 5, wherein the error estimation module further includes instructions to:
   after the vehicle has traveled the predetermined distance in the second lane segment, determine the location of the vehicle in the second lane segment;
   determine a difference between a prediction of the location in the second lane segment and a determination of the location of the vehicle in the second lane segment; and
   provide the difference between the prediction of the location in the second lane segment and the determination of the location of the vehicle in the second lane segment and the identifier of the second lane segment as second training data to the lane error estimation model.

7. A method for estimating lane error for a lane segment, comprising:
   receiving, by a processor, a predicted location in the lane segment of a plurality lane segments for a first vehicle traveling on the lane segment, wherein the predicted location is at a predetermined distance from the first vehicle;
   receiving, by the processor, a determined location of the first vehicle in the lane segment for the first vehicle, wherein the determined location of the first vehicle in the lane segment was produced after the first vehicle traveled the predetermined distance in the lane segment;

determining, by the processor, a difference between the predicted location in the lane segment received for the first vehicle and the determined location of the first vehicle in the lane segment;
providing, by the processor, the difference between the predicted location in the lane segment received for the first vehicle and the determined location of the first vehicle in the lane segment and an identifier of the lane segment as first training data to a lane error estimation model;
receiving, by the processor, the identifier of the lane segment;
based on the identifier of the lane segment and the lane error estimation model, predicting, by the processor, a lane error for the lane segment;
determining, by the processor, whether the lane error satisfies a lane error threshold; and
performing, by the processor and in response to a determination that the lane error does not satisfy the lane error threshold, a procedure to cause an autonomous driving module to disable at least one of one or more autonomous or semi-autonomous driving modes,
the autonomous driving module including instructions that when executed by the processor cause the processor to control at least one vehicle system to operate according to the one or more autonomous or semi-autonomous driving modes,
the at least one vehicle system including one or more of a propulsion system, a braking system, a steering system, a throttle system, a transmission system, a signaling system, or a navigation system,
the processor, the autonomous driving module, and the at least one vehicle system being disposed on the first vehicle.

8. The method of claim 7, further comprising performing, by the processor and in response to the determination that the lane error satisfies the lane error threshold, at least one of a procedure to alert a driver of the first vehicle or a procedure to determine an alternative route for the first vehicle that does not include the lane segment.

9. The method of claim 8, wherein the procedure to cause the autonomous driving module to disable the at least one of the one or more autonomous or semi-autonomous modes for the first vehicle comprises disabling lane assist for the first vehicle for the lane segment.

10. The method of claim 7, further comprising:
receiving, by the processor, a predicted location in the lane segment of the plurality lane segments for a second vehicle traveling on the lane segment, wherein the predicted location is at the predetermined distance from the second vehicle;
receiving, by the processor, a determined location of the second vehicle in the lane segment, wherein the determined location of the second vehicle was produced after the second vehicle traveled the predetermined distance in the lane segment;
determining, by the processor, a difference between the predicted location in the lane segment received for the second vehicle and the determined location of the second vehicle in the lane segment; and
providing, by the processor, the difference between the predicted location in the lane segment received for the second vehicle and the determined location of the second vehicle in the lane segment and the identifier of the lane segment as second training data to the lane error estimation model.

11. The method of claim 7, wherein the predicted location in the lane segment at the predetermined distance from the first vehicle is a center of the lane segment.

12. A non-transitory computer-readable medium for estimating lane error including instructions that when executed by one or more processors cause the one or more processors to:
receive an identifier of a lane segment of a plurality of lane segments for a first vehicle;
based on the identifier of the lane segment and a lane error estimation model, predict a lane error for the lane segment, the lane error estimation model having been produced from training data that include differences between predictions of locations of the first vehicle in other lane segments at previous times and determinations of the locations of the first vehicle in the other lane segments at the previous times;
determine if the lane error satisfies a threshold lane error; and
in response to a determination that the lane error does not satisfy the threshold lane error, perform a procedure to cause an autonomous driving module to disable at least one of one or more autonomous or semi-autonomous driving modes,
the autonomous driving module including instructions that when executed by the one or more processors cause the one or more processors to control at least one vehicle system to operate according to the one or more autonomous or semi-autonomous driving modes,
the at least one vehicle system including one or more of a propulsion system, a braking system, a steering system, a throttle system, a transmission system, a signaling system, or a navigation system,
the one or more processors, the autonomous driving module, and the at least one vehicle system being disposed on the first vehicle.

13. The non-transitory computer-readable medium of claim 12, further including instructions that when executed by one or more processors cause the one or more processors to perform, in response to a determination that the lane error does not satisfy the threshold lane error, perform at least one of a procedure to alert a driver of the first vehicle or a procedure to determine an alternative route for the first vehicle that does not include the lane segment.

14. The non-transitory computer-readable medium of claim 13, wherein the procedure to cause the autonomous driving module to disable the at least one of the one or more autonomous or semi-autonomous driving modes comprises disabling lane assist for the lane segment.

15. The non-transitory computer-readable medium of claim 12, further including instructions that when executed by one or more processors cause the one or more processors to:
receive a predicted location in the lane segment of the plurality lane segments for a second vehicle traveling on the lane segment, wherein the predicted location is at the predetermined distance from the second vehicle;
receive a determined location of the second vehicle in the lane segment, wherein the determined location of the second vehicle was produced after the second vehicle traveled the predetermined distance in the lane segment;
determine a difference between the predicted location in the lane segment received for the second vehicle and the determined location of the second vehicle in the lane segment; and provide the difference between the predicted location in the lane segment received for the second vehicle and the determined location of the second vehicle in the lane segment and the identifier of the lane segment as training data to the lane error estimation model.

16. The vehicle having the lane error estimation system of claim 1, wherein the lane safety module further includes instructions to perform, in response to a determination that the vehicle has exited the second lane segment, a procedure to cause the autonomous driving module to enable the at least one of the one or more autonomous or semi-autonomous driving modes.

17. The method of claim 7, further comprising performing, by the processor and in response to a determination that the first vehicle has exited the lane segment, a procedure to cause the autonomous driving module to enable the at least one of the one or more autonomous or semi-autonomous driving modes.

18. The non-transitory computer-readable medium of claim 12, further comprising instructions to perform, in response to a determination that the first vehicle has exited the lane segment, a procedure to cause the autonomous driving module to enable the at least one of the one or more autonomous or semi-autonomous driving modes.

19. A vehicle, comprising:
a vehicle motion control system;
a processor; and
a memory storing:
    an autonomous driving module including instructions that cause the processor to control the vehicle motion control system to operate in a mode that is at least semi-autonomous; and
    a lane error estimation module including instructions that cause the processor to:
        predict, using a lane error estimation model and an identifier of a lane segment, a lane error, the lane error estimation model having been produced from training data that include differences between predictions of locations of the vehicle in other lane segments at previous times and determinations of the locations of the vehicle in the other lane segments at the previous times; and
        perform, in response to the lane error exceeding a threshold, a procedure to cause the autonomous driving module to disable the mode that is at least semi-autonomous.

\* \* \* \* \*